Sept. 14, 1965   L. W. JOHNSON   3,206,247
INFANT'S SEAT
Filed June 16, 1964   2 Sheets-Sheet 1
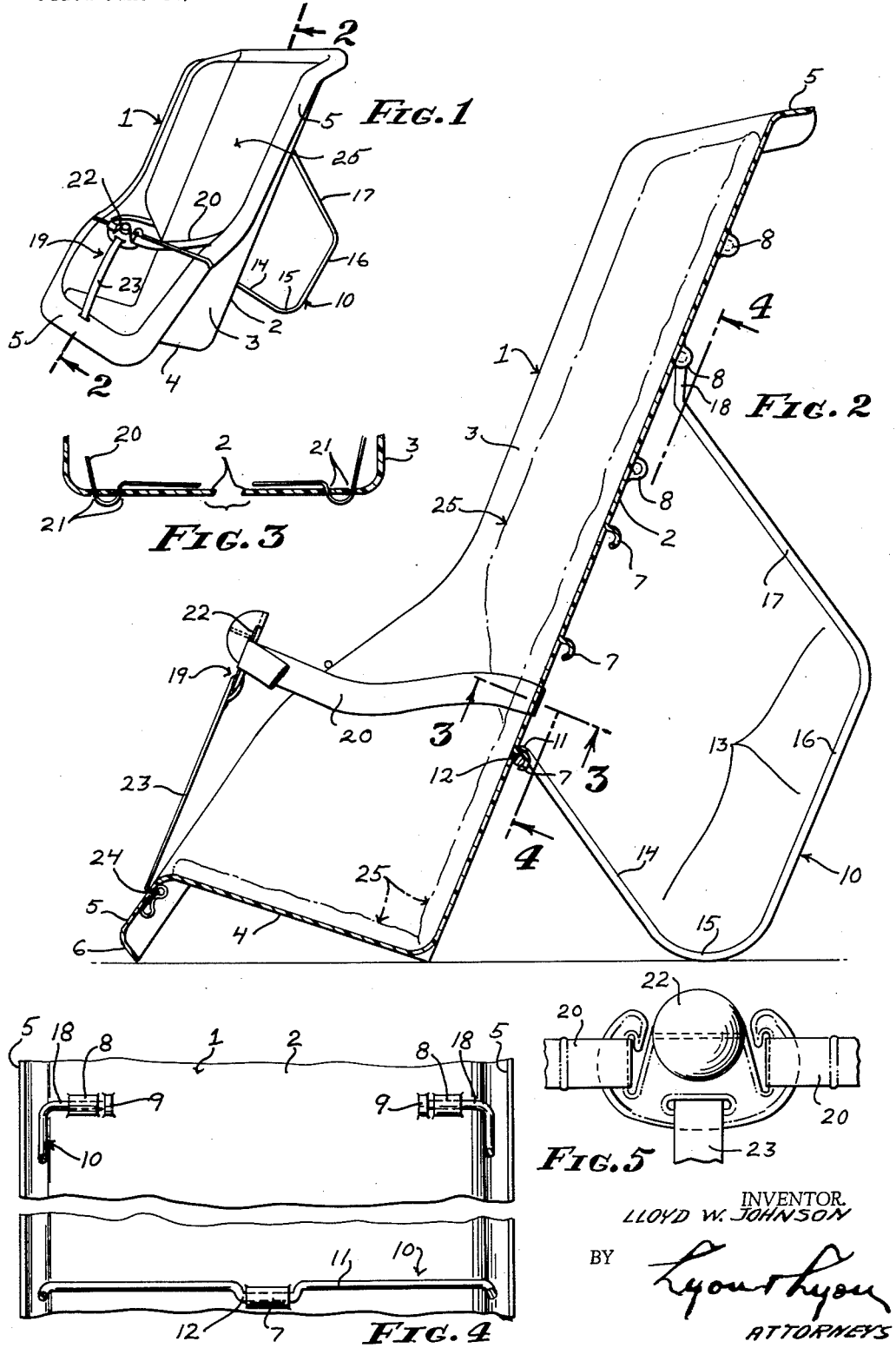
INVENTOR.
LLOYD W. JOHNSON
BY
Lyon+Lyon
ATTORNEYS

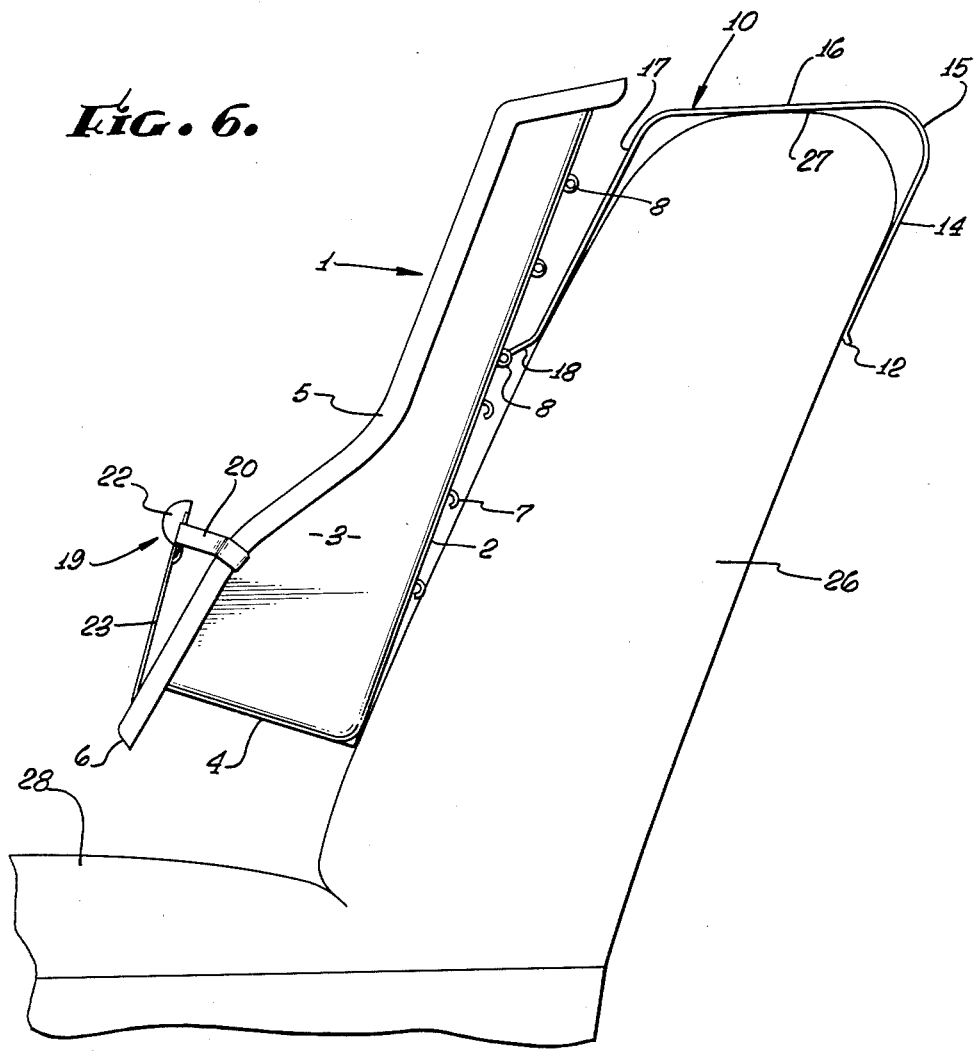

3,206,247
INFANT'S SEAT
Lloyd W. Johnson, % Jet Plastics Co., 941 N. Eastern
Ave., Los Angeles, Calif.
Filed June 16, 1964, Ser. No. 375,429
5 Claims. (Cl. 297—254)

This application constitutes a continuation-in-part of applicant's co-pending application bearing Serial No. 151,641, filed November 13, 1961, now abandoned This invention relates to infant's seats, and an object of this invention is to provide an infant's seat so arranged that its principal member may be molded in a single piece of semiflexible, yet tough and strong, plastic material readily capable of withstanding the loads imposed, yet light in weight and easily maintained in a clean and sanitary condition.

Another object of this invention is to provide an infant's seat which is provided with a novel supporting frame as well as a simple and convenient means whereby the supporting frame may be readily and quickly adjusted to position the infant's seat in various angular positions.

A further object is to provide an infant's seat wherein the novel supporting frame may be swung to a second position forming a hook for vertically suspending the infant's seat.

These and other objects of the invention will be made more fully apparent from a consideration of the description which follows taken in conjunction with the drawings.

In the drawings:

FIGURE 1 is a perspective view of the infant's seat;

FIGURE 2 is an enlarged, longitudinal, sectional view thereof taken through 2—2 of FIGURE 1;

FIGURE 3 is a fragmentary, transverse, sectional view thereof taken through 3—3 of FIGURE 2;

FIGURE 4 is a fragmentary back view taken along the plane 4—4 of FIGURE 2 with the supporting frame shown in section;

FIGURE 5 is a fragmentary, elevational view of the harness buckle and associated harness straps; and FIGURE 6 is a side elevational view of the infant's seat and supporting frame wherein the frame is pivoted to a second position forming a hook over a seat back.

The infant's seat includes a seat structure 1 having a relatively flat back wall 2, side walls 3, and a bottom wall 4. The bottom wall is of greater depth than the side walls, and the lower portion of the side walls increase in depth to join the forward or extended margin of the bottom wall 4.

Formed across the bottom wall 4, along the margins of the side walls 3, and across the top edge of the back wall 2 is a marginal flange 5. The marginal flange which extends along the side walls 3 and across the bottom wall 4 is turned under to form a lip 6.

The seat structure 1 is molded of high strength plastic material, preferably a plastic material that is slightly yieldable, rather than rigid.

The central portion of the back wall 2 is provided with a series of integral hook elements or retainer clips 7 arranged in a vertical row. At its upper portion adjacent the side walls 3 the back wall 2 is provided with pairs of journal elements or integral retainer loops 8. Spaced a short distance inwardly from each journal loop 8 is a stop boss 9.

The hook and journal elements 7 and 8 are employed to mount a supporting frame 10 on the back wall 2. The supporting frame includes a cross portion 11 having an offset center 12 adapted to hook into a selected hook element 7, as shown in FIGURES 2 and 4.

Extending from each end of the cross portion 11 is a leg loop 13 which is also essentially U-shaped in side aspect. That is, the leg loop 13 includes a downwardly extending portion 14 terminating in a curved portion 15 which is adapted to rest on a surface supporting the lower edge of the back wall 2.

Each leg loop 13 continues upwardly to form a sloping portion 16 which is substantially parallel with the back wall 2, and joins to an upper portion 17 which extends toward the back wall 2 and terminates in an inturned end 18. The inturned ends thus formed are adapted to be inserted laterally into a selected pair of journal elements or retainer loops 8 until they are in engagement with the stop bosses 9, as shown in FIGURE 4. By selecting appropriate corresponding journal and hook elements, the angular position of the seat structure 1 may be changed.

The lower portion of the seat structure 1 receives a harness 19 which includes a body-encircling strap 20, the back side of which is threaded through pairs of slits 21 formed in the back wall 2. The front portions or extremities of the body strap 20 are joined to opposite ends of a buckle 22.

Attached to the buckle 22 is a front strap 23 which extends to the marginal flange 5 at the mid portion of the bottom wall 4, and is threaded in slits 24 provided in the marginal flange 5.

The seat structure 1 is adapted to receive a cushion 25, shown by broken lines in FIGURE 2, which is arranged to line the walls of the seat structure.

As previously described the first position of the supporting frame 10, where the cross portion 11 is hooked over one of the hook elements 7, will support the infant's seat 1 on a horizontal surface, such as illustrated in FIGURE 2.

In FIGURE 6, the supporting frame 10 is illustrated in its second position. In this position, the cross portion 11 is released from one of the hook elements 7 and the inturned ends 18 of the leg loops 13 will pivot in the journal elements moving the frame 10 to the open second position.

The loops 13 may then be hooked over a seat back 25 with the sloping portion 16 bearing upon the top 26 of the seat back 25. The infant's seat will then be vertically suspended from the seat.

This open second position of the frame 10 is particularly adaptable for automobile seats so that an infant reposing in the seat 1 need not be transferred from one chair or seat to another.

With the various pairs of journal elements 8, it can be seen that the frame 10 may be adjusted so that the seat 1 suspends therefrom at a desired elevation relative to the seat 27.

Normally the portions 14 and 17 may be sprung apart, when a resilient material is used, so as to grip to seat back 25 and further support the infant's seat 1.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent devices.

What is claimed is:

1. An infant's seat comprising a seat structure formed of plastic material and including a back wall, opposed side walls, and a bottom wall; a series of retainer hooks disposed in the lower midportion of said back wall; a series of retainer loops arranged in pairs at opposite side margins of said back wall; and a supporting frame including a cross portion having a central offset section adapted to fit a selected retainer hook and be retained thereby against lateral displacement, a pair of supporting leg elements at the extremities of said cross portion, and a pair of inturned end portions at the extremities of said leg elements adapted to fit a selected pair of said retainer loops.

2. An infant's seat comprising a seat structure formed of plastic material and including a back wall, opposed side walls, and a bottom wall; a series of retainer hooks disposed in the lower midportion of said back wall; a series of retainer loops arranged in pairs at opposite side margins of said back wall; stops inwardly of said retainer loops; and a supporting frame including a cross portion having a central offset section adapted to fit a selected retainer hook and be retained thereby against lateral displacement, a pair of supporting leg elements at the extremities of said cross portion and a pair of inturned end portions at the extremities of said leg elements adapted to extend through a selected pair of retainer loops and abut the corresponding stops.

3. An infant's seat as defined in claim 1 wherein said central offset section of said cross portion is removably retained in said retainer hook, and wherein said inturned end portions of said leg elements are removably and rotatably mounted in said selected pair of said retainer loops, whereby said supporting frame will support said seat structure at a selected inclination on a generally horizontal surface in a first position, and when said crossbar is disengaged from said retainer hook said supporting frame may be swung in said selected pair of said retainer loops to a second position forming a hook for vertically suspending said seat structure.

4. An infant's seat and support combination comprising a seat structure including a back wall, opposed side walls, and a bottom wall; a series of retainer loops arranged in laterally disposed pairs adjacent the side margins on the rear of said back wall; a series of retainer elements disposed below said retainer loops on the rear of said back wall; a swingable wire support frame including a lateral crossbar portion, a pair of generally U-shaped supporting legs extending from the extremities of said crossbar portion and terminating in upper end portions normal to the plane defined by each of said U-shaped supporting legs, said end portions removably and rotatably mounted in a pair of said retainer loops; said crossbar portion being removably retained on one of said retainer elements whereby said support frame will support said seat structure at a selected inclination on a generally horizontal surface in a first position, and when said crossbar is disengaged from said retainer element said supporting frame may be swung in said retainer loops to a second position forming a hook for vertically suspending said seat structure.

5. An infant's seat and support combination comprising a seat structure including a back wall, opposed side walls, and a bottom wall; a pair of retainer loops adjacent the side margins on the rear of said back wall; a retainer element disposed below said retainer loops on the rear of said back wall; a swingable wire support frame including a lateral crossbar portion, a pair of generally U-shaped supporting legs extending from the extremities of said crossbar portion and terminating in upper end portions normal to the plane defined by each of said U-shaped supporting legs, said end portions rotatably mounted in said retainer loops; said crossbar portion being removably retained on said retainer element whereby said support frame will support said seat structure at an inclination on a generally horizontal surface in a first position, and when said crossbar is disengaged from said retainer element said supporting frame may be swung in said retainer loops to a second position forming a hook for vertically suspending said seat structure.

References Cited by the Examiner

UNITED STATES PATENTS

| 1,709,822 | 4/29 | Griffith | 248—465 |
|---|---|---|---|
| 2,014,176 | 10/35 | Henderson | 248—456 |
| 2,324,421 | 7/43 | Ouellette | 297—325 |
| 2,399,792 | 5/46 | Copp | 297—255 |
| 2,530,296 | 11/50 | Gahris | 248—451 |
| 2,563,671 | 8/51 | Basinger | 248—456 |
| 2,792,668 | 5/57 | Gallamos | 248—456 |
| 3,006,688 | 10/61 | Ouellette | 297—457 |
| 3,101,972 | 8/63 | Laughlin | 297—457 |

FRANK B. SHERRY, *Primary Examiner*.